United States Patent [19]

Sato

[11] Patent Number: 5,610,894
[45] Date of Patent: Mar. 11, 1997

[54] OPTICAL INFORMATION REPRODUCING APPARATUS AND RECORDING MEDIUM

[75] Inventor: Chiaki Sato, Tokyo, Japan

[73] Assignee: Olympus Optical Co., Ltd., Tokyo, Japan

[21] Appl. No.: 186,249

[22] Filed: Jan. 24, 1994

Related U.S. Application Data

[63] Continuation of Ser. No. 832,741, Feb. 7, 1992, abandoned.

[30] Foreign Application Priority Data

| Feb. 25, 1991 | [JP] | Japan | 3-053303 |
| May 15, 1991 | [JP] | Japan | 3-110530 |
| Jan. 13, 1992 | [JP] | Japan | 4-004190 |

[51] Int. Cl.[6] ................................ G11B 7/00
[52] U.S. Cl. ............ 369/112; 369/44.23; 369/275.3
[58] Field of Search ....................... 369/44.11, 44.12, 369/44.23, 44.24, 44.26, 275.1, 44.37, 275.3, 47, 275.4, 48, 54, 112, 109, 110, 121, 124; 359/577

[56] References Cited

U.S. PATENT DOCUMENTS

| 3,883,232 | 5/1975 | Tsunoda | 359/577 |
| 4,006,293 | 2/1977 | Bauhuis et al. | 369/109 |
| 4,171,879 | 10/1979 | Bricot et al. | 369/44.24 |
| 4,325,135 | 4/1982 | Dil et al. | 369/109 |
| 4,359,750 | 11/1982 | Howe | 369/111 |
| 4,450,547 | 5/1984 | Nakamura | 369/44.24 |
| 4,987,301 | 1/1991 | Nakamura | 369/44.37 |
| 5,045,868 | 9/1991 | Tajima | 369/44.24 |
| 5,056,080 | 10/1991 | Russell | 369/100 |
| 5,105,399 | 4/1992 | Shimonou | 369/110 |
| 5,202,878 | 4/1993 | Kanehira et al. | 369/44.26 |
| 5,291,471 | 3/1994 | Russell | 369/109 |
| 5,303,224 | 4/1994 | Chikuma et al. | 369/112 |
| 5,329,517 | 7/1994 | Yamaguchi et al. | 369/110 |

FOREIGN PATENT DOCUMENTS

| 2-10523 | 1/1990 | Japan . |
| 2-263333 | 10/1990 | Japan . |

OTHER PUBLICATIONS

"Isolation of Axi–Symmetrical Optical–Resonator Modes"; Applied Physics Letters, vol. 2, No. 3, Feb. 1, 1963.

Primary Examiner—Nabil Hindi
Attorney, Agent, or Firm—Frishauf, Holtz, Goodman, Langer & Chick

[57] ABSTRACT

Light emitted from a semiconductor laser is collimated by a collimator lens into a parallel beam. The parallel beam enters a phase plate which provides a phase difference of $\pi$ to a half of the beam. The beam, which has passed through the phase plate, enters an objective lens and is converged onto an optical disc. The optical disc has a number of mark sets along the track, each mark set comprising optically detectable two marks. The beam from the optical disc is collected into the objective lens and is reflected by a polarized beam splitter into a light detector. The output from a light-element of the light detector is delivered to a differential amplifier and a summing amplifier. The outputs from the differential amplifier and summing amplifier are input to a divider. The output from the divider is delivered to an information reproducing unit. The information reproducing unit reproduces information recorded on the optical disc on the basis of the input, and outputs the reproduced information.

18 Claims, 10 Drawing Sheets

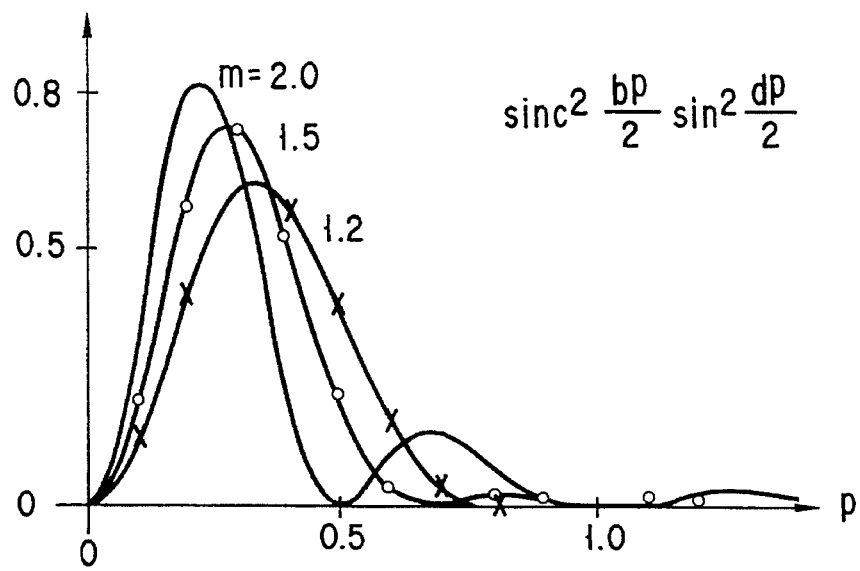
F I G. 4A
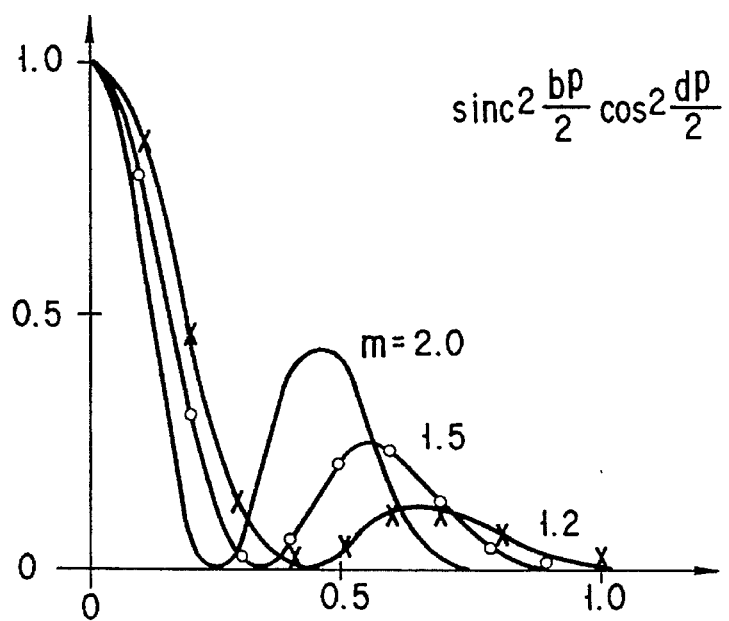
F I G. 4B

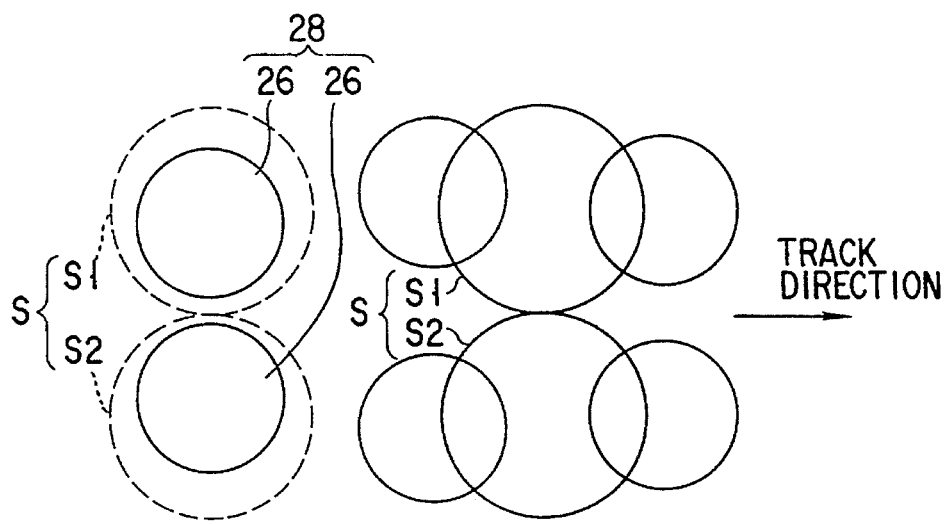
F I G. 6A
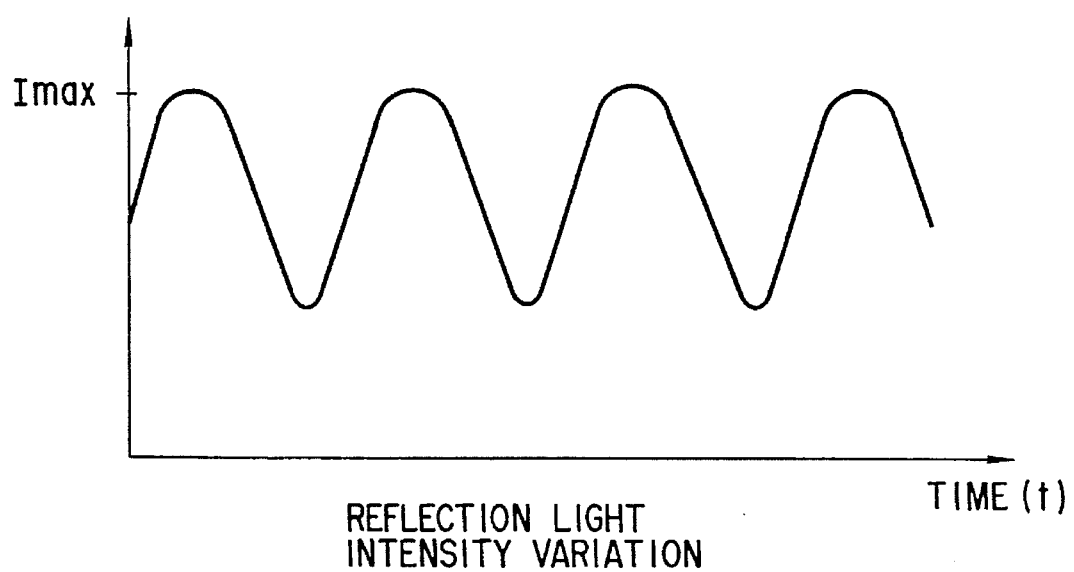
F I G. 6B

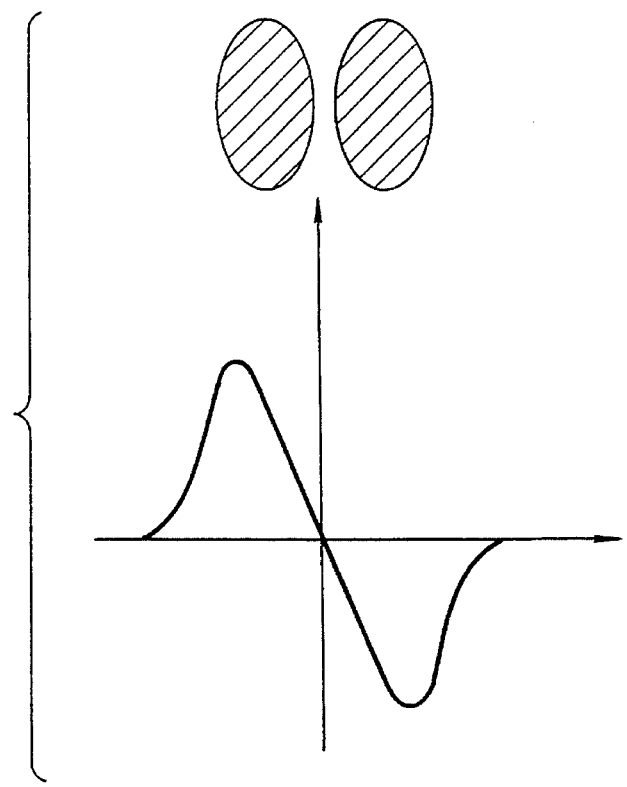
F I G. 9
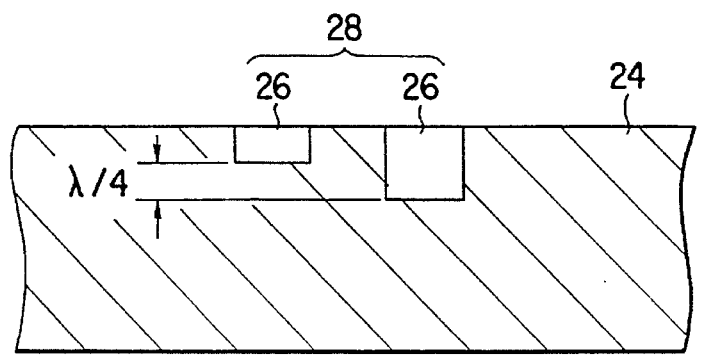
F I G. 10

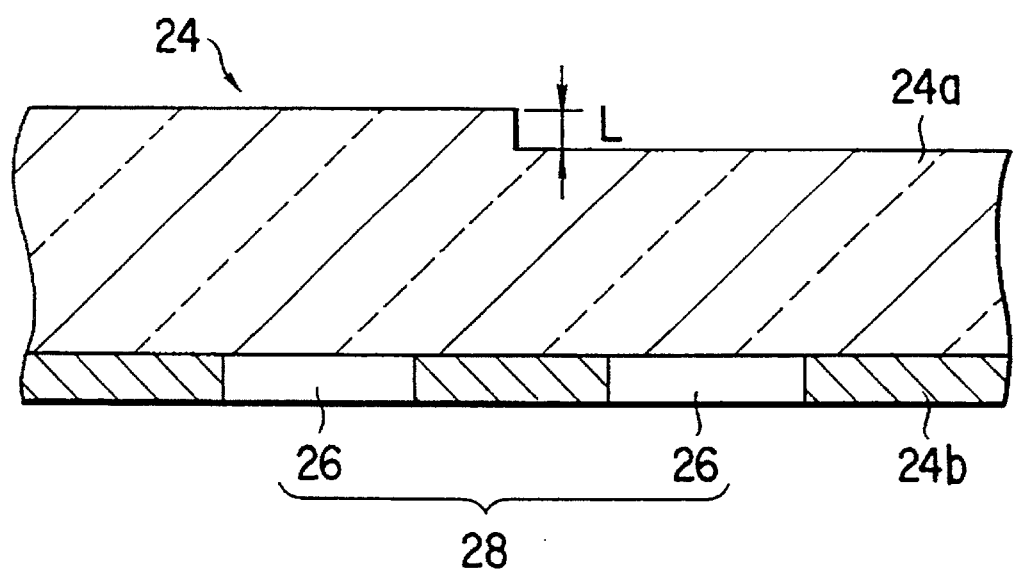
F I G. 11

OPTICAL INFORMATION REPRODUCING APPARATUS AND RECORDING MEDIUM

This application is a Continuation of application Ser. No. 07/832,741, filed Feb. 7, 1992, now abandoned.

BACKGROUND OF THE INVENTION

1. Field of the Invention

The present invention relates to an optical information reproducing apparatus for optically reproducing information recorded in a recording medium, and to the recording medium on which information is recorded.

2. Description of the Related Art

With recent development of the information-orientated society, the amount of information processed has increased remarkably, and there is a demand for a system capable of recording/reproducing a great amount of information. To meet the demand, there have been proposed various optical information processing systems capable of recording/reproducing information at high density. According to these systems, information is coded into optically detectable physical marks and recorded on a recording medium. By detecting the marks by optical means, the information is reproduced. Examples of such marks are projections, recesses and holes formed on or in the recording medium.

This type of optical system meets the present demand to a certain extent. On the other hand, however, there is a demand for a novel information processing system capable of recording data at high density. To meet such a demand, novel information processing systems have been widely studied and developed.

SUMMARY OF THE INVENTION

The object of the present invention is to provide an optical information reproducing apparatus capable of enhancing recording density.

This invention provides an optical information reproducing apparatus for optically reproducing information recorded as a distance between two of optically detectable marks constituting each of a number of mark sets provided along a track of a recording medium. The optical apparatus includes a light source for emitting a reproducing light beam, and radiating means for simultaneously radiating the reproducing light beam onto the two marks constituting each mark sets phase shifting means part of phase difference providing means provides a predetermined phase difference between a part of the reproducing light beam from one mark of the mark set, and the remaining part of the reproducing light beam from the other mark of the mark set. Information reproducing means receives the reproducing beam from the mark set and reproducing information. In this description, the reproducing light beam may be a light beam from the light source to the mark set, a light beam reflected from the mark set or a light beam passing through the mark set.

The phase of part of the beam from one mark of the mark set is shifted from the phase of the other part of the beam from the other mark of the mark set by a predetermined angle (preferably $\pi$). For example, this beam can be obtained by illuminating the mark set with a light beam having an inverted amplitude distribution. The beam having the inverted amplitude distribution can be obtained, for example, by situating a phase plate so as to pass part of the reproducing beam through. Alternatively, it can be obtained by using a laser light source oscillating in multi-modes, and selectively obtaining only a light beam of one of the multi-modes in which the amplitude distribution is inverted. When the beam with inverted amplitude distribution is radiated on two marks of set, the diffraction angle of the beam is smaller than in the case of radiating an ordinary beam, and the interval of peaks (including information on the distance between marks) appearing in the light intensity distribution is narrower. This means that the lower limit of the distance between marks, which is restricted by a numerical aperture in the objective lens, can be lowered, and accordingly the recording density is enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 4A is a graph showing a light intensity distribution from a mark set illuminated with the phase-shifted beam;

FIG. 4B is a graph showing a light intensity distribution from a mark set illuminated with a normal light beam;

FIG. 6A shows the positional relationship between the mark sets, each of which includes the marks arranged perpendicular to the track, and the beam spot;

FIG. 6B is a graph showing a reflection light intensity varying with the passage of time, which is obtained when the mark sets shown in FIG. 6A are illuminated;

FIG. 9 shows a mode pattern of light beam of $TEM_{01}$ and an amplitude distribution;

FIG. 10 shows an optical disc for a reflection type optical system which generates a phase-shifted light beam; and FIG. 11 shows an optical disc for a transmission type optical system which generates a phase-shifted light beam.

DETAILED DESCRIPTION OF THE PREFERRED EMBODIMENTS

An embodiment of the invention will now be described with reference to the accompanying drawings.

Figure 1:
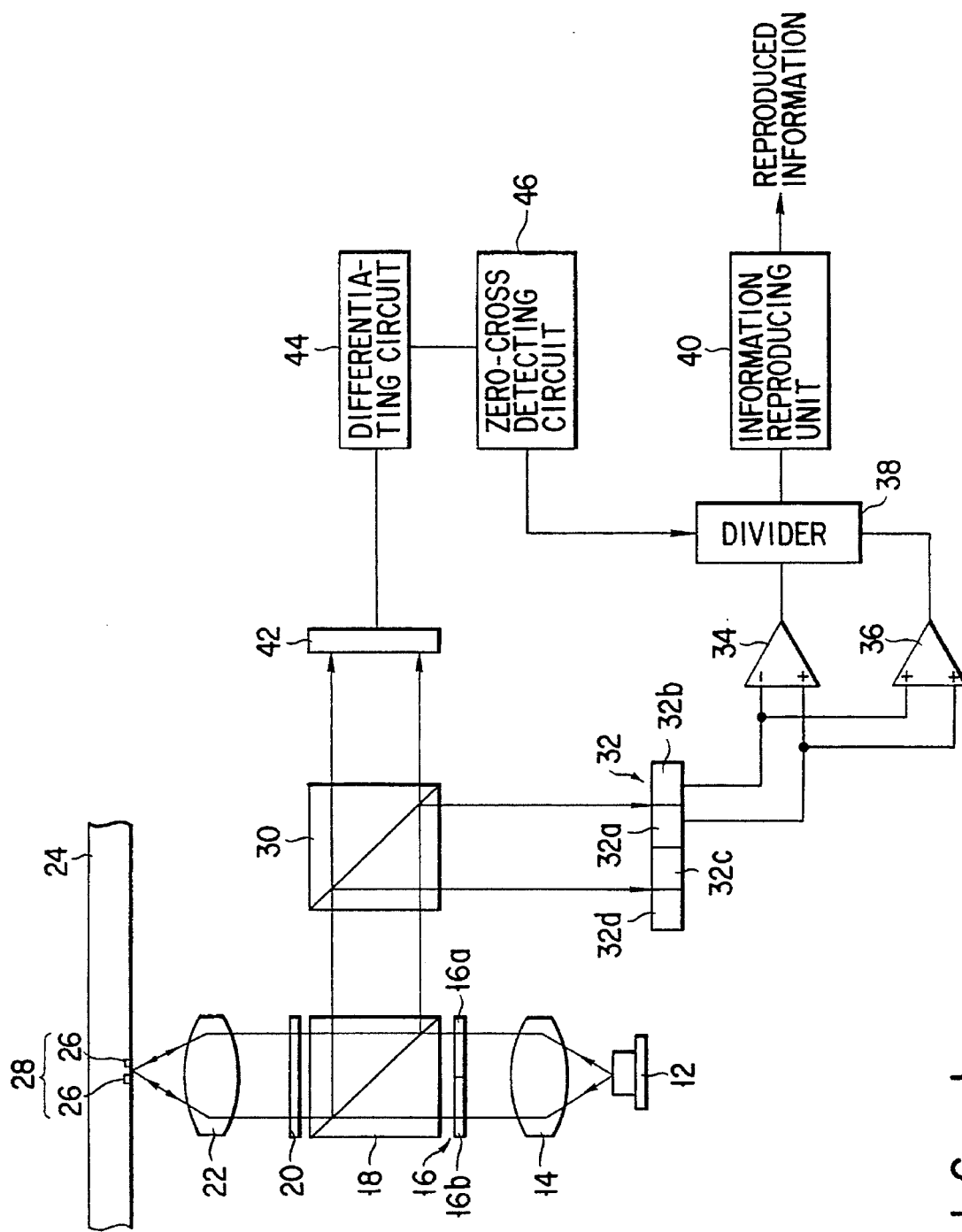
FIG. 1 shows the structure of an optical information reproducing apparatus according to an embodiment of the present invention.

FIG. 1 shows an optical system of an information reproducing apparatus according to the embodiment of the invention. Light emitted from a semiconductor laser 12 is changed to a parallel light beam through a collimator lens 14, and the parallel beam enters a phase plate 16. The phase plate 16 has optically transparent two regions 16a and 16b. The region 16a is so treated as to provide a phase variation to a light beam which passes through it, the phase variation corresponds to an odd-number times of π with respect to a phase of the light beam which passes through the region 16b. Specifically, a thin film of ZnS or MgF is deposited on the region 16a to a thickness corresponding to an odd-number times of λ/2×(n−1) (λ=the wavelength of light emitted from semiconductor laser 12, n=the refractive index of the thin film). Thereby, the phase of light which has passed through the region 16a is displaced by an odd-number times of λ. The parallel beam emitted from the phase plate 16 enters a polarized beam splitter 18. The laser beam emitted from the semiconductor laser 12 is a linear polarized beam, and the direction of polarization is determined such that the beam can pass through the polarized beam splitter 18. Accordingly, the light emitted from the phase plate 16 is transmitted through the beam splitter 18 and enters a λ/4 plate 20. The linear polarized beam is converted to a circular polarized beam through the λ/4 plate 20. The circular polarized beam is converged through an objective lens 22 onto an optical disc 24. The beam illuminates one of mark sets 28 arranged along the track on the disc. Each mark set 28 is constituted by optically detectable two marks 26. The mark 26 is, for example, an opening employed in a transmission type optical system or a pit employed in a reflection type optical system. Light reflected by the optical disc 24 is collected by the objective lens 22, guided through the λ/4 plate 20, and made incident on the beam splitter 18. The light incident on the beam splitter 18, which has passed the λ/4 plate twice, becomes a linear polarized beam, the polarization direction of which is rotated 90° in respect of the light just emitted from the laser 12. Accordingly, the linear polarized beam is reflected by the beam splitter 18. The light reflected by the beam splitter 18 is divided by a beam splitter 30 into two beams. The two beams are led to light detectors 32 and 42, respectively.

In this optical system, information is recorded as a distance between two marks 26 of the mark set 28. The positions of peaks appearing in a coherence pattern obtained by illuminating the mark set 28 vary, depending on the distance between marks. Specifically, the distance between peaks in the coherence pattern decreases as the distance between marks increases; inversely, the distance between peaks increases as the distance between marks decreases. Accordingly, by detecting the positions of peaks, information can be reproduced. The detector 32 detects the positions of peaks, and comprises four light-receiving elements 32a, 32b, 32c and 32d divided in a direction perpendicular to the sheet surface of FIG. 1. The light-receiving elements 32a and 32b are arranged on one side of a light axis, and the light-receiving elements 32c and 32d on the other side. For the purpose of simplicity, only the light-receiving elements 32a and 32b are employed for detection of peaks. Outputs from the light-receiving elements 32a and 32b are input, respectively, to a differential amplifier 34 and a summing amplifier 36. Outputs from the differential amplifier 34 and summing amplifier 36 are input to a divider 38. The divider 38 outputs (A−B)/(A+B) wherein A is the output from the light-receiving element 32a and B is the output from the light-receiving element 32b. The output of this arithmetic result is delivered to an information reproducing unit 40. Based on the arithmetic result, the information reproducing unit 40 finds a mark distance, and reproduces information recorded in the optical disc. The arithmetic operation of the divider 38 is performed by employing, as a sync signal, an output pulse from a zero-cross detecting circuit 46. This will be described later.

Figure 2:
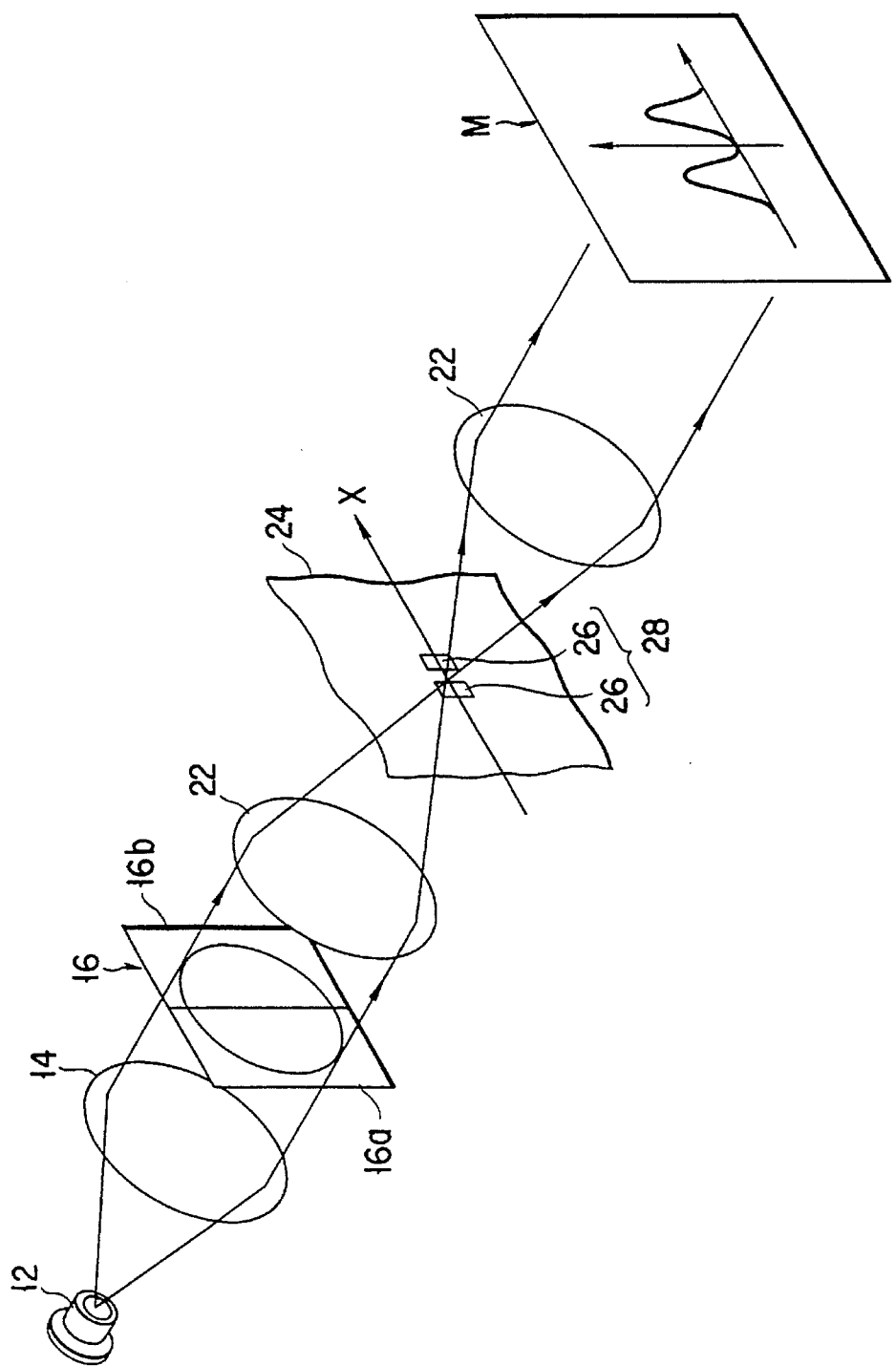
FIG. 2 shows schematically the optical system of the optical apparatus shown in FIG. 1.

The optical characteristics of the present embodiment will now be described. For the purpose of simplicity, a transmission-type optical system shown in FIG. 2, which is equivalent to the optical system of FIG. 1, will be referred to.

The phase plate 16 situated in a front focal plane of the objective lens 22 provides a phase difference π between a beam passing through the region 16a and a beam passing through the region 16b. Thus, the complex amplitude A(u) in a back focal plane of the objective lens 22 is given by $$A(u) = \int_{-a}^{a} f(x) e^{iux} dx \qquad (1)$$

where f(x) denotes the complex amplitude transmittance of the phase plate 16 and is expressed by $$f(x) = \begin{cases} 1 & (0 \leq x \leq a) \\ e^{i\pi} = -1 & (-a \leq x < 0) \end{cases} \qquad (2)$$

The phase plate 16 provides a variation only to the phase of a wave plane passing through the region 16a, and does not provide an amplitude variation. Accordingly, from equations (1) and (2), $$\begin{aligned} A(u) &= \int_{0}^{a} e^{iux} dx - \int_{-a}^{0} e^{iux} dx \\ &= i\, 2a\, \text{sinc}\, \frac{au}{2} \sin \frac{au}{2} \end{aligned} \qquad (3)$$

where u is $$\begin{aligned} u &= \frac{2\pi}{\lambda} \cdot \frac{x_1}{f} \\ &= k \sin \theta \; (\theta: \text{diffraction angle}) \end{aligned} \qquad (4)$$

The distribution is given by $$I(u) = 4b^2 \, \text{sinc}^2 \frac{au}{2} \sin^2 \frac{au}{2} \qquad (5)$$

Figure 3:
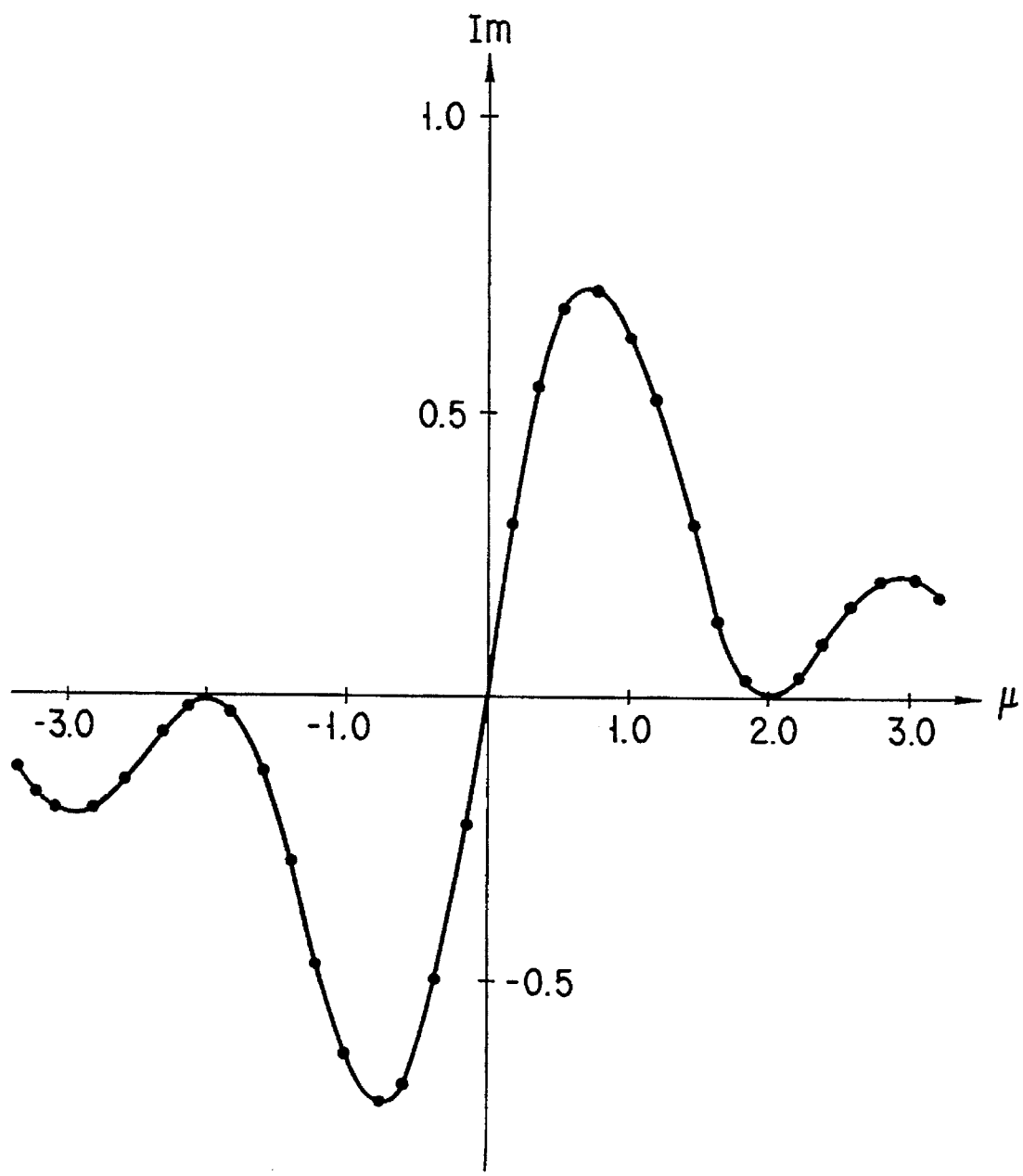
FIG. 3 is a graph showing an amplitude distribution of a phase-shifted light beam on an optical disc.

FIG. 3 shows the light amplitude distribution in the back focal plane of the objective lens, which is given by equation (3). It is understood that the amplitude of diffraction light is reversed. Hereinafter, the light having its amplitude reversed in the diffraction image plane (back focal plane) as shown in FIG. 3 is called phase-shifted light.

We will now consider the case where the mark set 28 is illuminated by phase-shifted light. The mark set 28 is constituted by two marks 26. The two marks 26 are illuminated by beams having phases displaced from each other by π.

For the purpose of simplicity, it is assumed that plane waves are made incident on the mark set 28. Where the mark width is b and the mark distance is d, the complex amplitude distribution $P(x_0)$ in an observation plane M is give by $$P(x_0) = \int_{d/2-b/2}^{d/2+b/2} e^{ipx_1} dx_1 + e^{i\pi} \int_{-d/2-b/2}^{-d/2+b/2} e^{ipx_1} dx_1 \quad (6)$$

where $$p = \frac{2\pi}{\lambda} \cdot \frac{x_0}{f} = k\sin\theta' \quad (7)$$

Accordingly, the intensity distribution $I(x_0)$ is given by $$I(x_0) = 4b^2 \operatorname{sinc}^2 \frac{bp}{2} \sin^2 \frac{dp}{2} \quad (8)$$

In the meantime, the intensity distribution of a diffraction image obtained when the marks are illuminated by ordinary in-phase plane waves is given by $$Ic(x_0) = 4b^2 \operatorname{sinc}^2 \frac{bp}{2} \cos^2 \quad (9)$$

The results of the above are shown in FIGS. 4A and 4B. That is, FIG. 4A shows the light intensity distribution obtained when the mark set 28 is illuminated by phase-shifted light, and FIG. 4B the light intensity distribution obtained when the mark 28 is illuminated by ordinary light. In FIG. 4, the relationship between the mark width and the mark distance is given by $$d = mb \quad (10)$$

where m=1.2, 1.5, and 2.0.

As can be seen from the above, when ordinary beams are employed, a 0th-order diffraction beam appears at the center, and a peak of the first order diffraction beam appears at a point at a distance of $\sin\theta = \lambda/d$ from the center. On the other hand, when phase-shifted beams are employed, no 0th-order diffraction beam exists, a peak of the first-order diffraction beam appears at a distance of $\sin\theta = \lambda/2d$, and the quantity of light of the first-order lobe, which is to be detected, increases. As can be understood by comparison of the above equations, the most important matter is that when the phase-shifted beams are employed, the diffraction angle of the first-order diffraction beam decreases and, therefore, without changing the number of openings of lens 22 receiving the diffraction beam, the lens 22 can receive a first-order diffraction beam having a large diffraction angle, which cannot be received in the case of using the ordinary beams. This means that the minimum limit of the mark distance, which is restricted by a numerical aperture of lens 22 since the first-order diffraction beam must enter the lens 22, can be further decreased. Accordingly, the mark distance of the mark set can be made smaller than in the prior art, and a greater quantity of information can be recorded in a single recording region. In other words, the recording density can be increased.

Figure 5A:
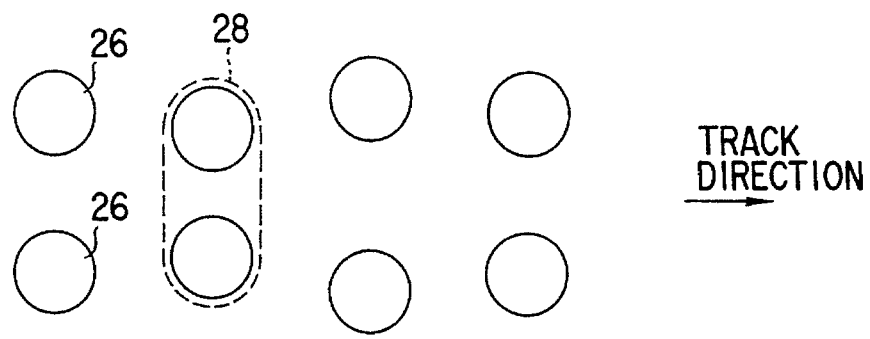
FIG. 5A shows mark sets, each of which includes marks arranged in a direction perpendicular to the track.
Figure 5B:
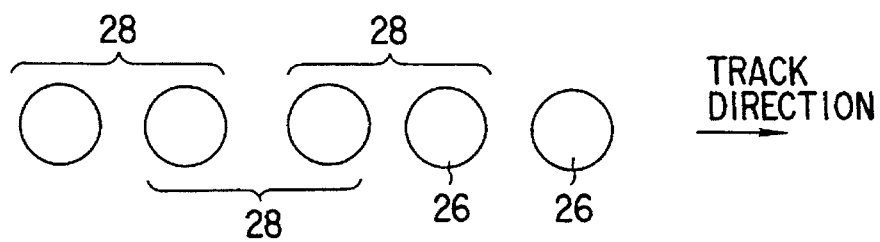
FIG. 5B shows mark sets, each of which includes marks arranged along the track.
Figure 5C:
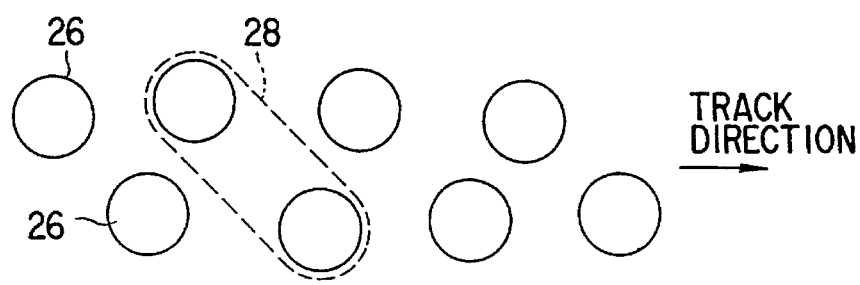
FIG. 5C shows mark sets, each of which includes marks arranged oblique to the track.

The angle defined by a line connecting the centers of the two marks of the mark set and a center line of the track can be freely determined. For example, as shown in FIG. 5A, the line connecting the centers of the two marks 26 of mark set 28 can be set to intersect the center line of the track substantially at right angles. Alternatively, as shown in FIG. 5B, the angle defined between the line connecting the centers of marks 26 of mark set 28 and the center line of the track may be set to 0°, that is, all marks 26 may be situated on the center line of the track. Further, as shown in FIG. 5C, the line connecting the centers of the two marks 26 of mark set 28 may be set to cross the center line of the track at a given angle. In the following description, the timing of information reproduction in the case where the line connecting the centers of the two marks of the mark set is substantially perpendicular to the center line of the track will be explained, and subsequently, the timing of information reproduction in the case where all marks are situated on the center line of the track will be explained.

FIG. 6A shows the positional relationship between the marks and the beam spot S in the case where the line connecting the centers of the two marks of the mark set is substantially perpendicular to the center line of the track, and FIG. 6B shows the reflection light intensity variation in this case. The mark 26 has a diameter of 1 µm, and the mark sets 28 are arranged with a pitch of 1.5 µm. Since the phase-shifted beams have a double-peak light intensity distribution, as stated above, a beam spot S formed on the optical disc has two adjacent circular spots S1 and S2. The diameter of each of circular spots S1 and S2 is 1.4 µm. The beam spot S moves in the direction of the arrow in FIG. 6A over the track with the passage of time. In this case, the reflection light intensity takes a minimum value when the beam spot S illuminates the mark set 28 in the optimal condition, and takes a maximum value when the spot S illuminates an intermediate area between the mark sets 28. In the figure, the beam spot S situated in a position where the reflection light intensity is minimum is indicated by broken lines, and the spot S in a position where the reflection light intensity is maximum is indicated by solid lines. The arithmetic operation of the divider 38 is performed when the reflection light intensity is minimum.

The timing at which the arithmetic operation is carried out is determined in the following manner. In FIG. 1, light emitted from the beam splitter 30 enters the light detector 42. The light detector 42 outputs a signal proportional to the light amount, and the signal is input to a differentiating circuit 44. The differentiating circuit 44 differentiates the signal from the light detector 42, and the differentiated output is supplied to a zero-cross detecting circuit 46. The zero-cross detecting circuit 46 detects a zero-cross of the signal output from the differentiating circuit 44, and outputs a pulse signal when the intensity of light received by the light detector 42 takes a minimum value. The pulse signal from the zero-cross detecting circuit 46 is input to the divider 38, and the divider 38 carries out an arithmetic operation by using the pulse signal as a sync signal. As a result, when the reflection light intensity takes a minimum value, the position of the peak of the reflection light distribution is detected by the above process, and the information recorded in the form of "pit distance" is reproduced.

Figure 7A:
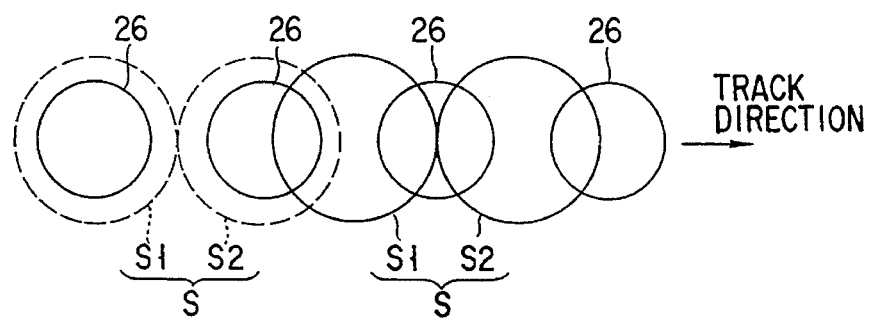
FIG. 7A shows the positional relationship between the mark sets, each of which includes the marks arranged along the track, and the beam spot.
Figure 7B:
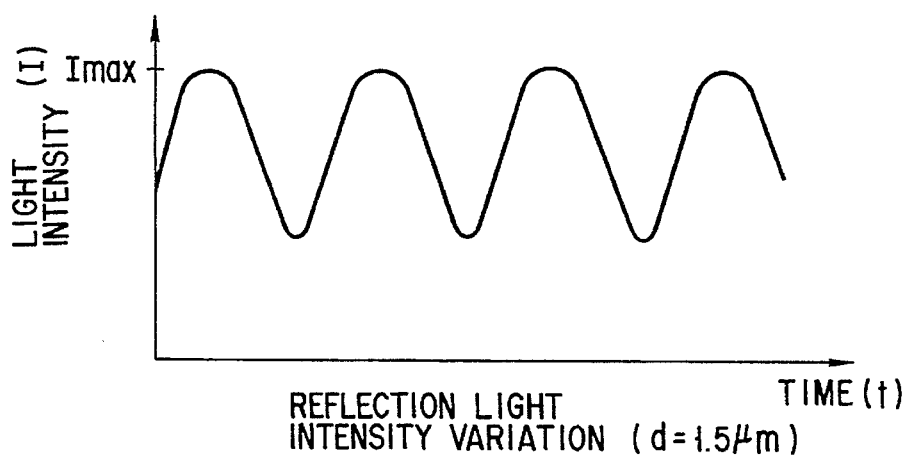
FIG. 7B is a graph showing a reflection light intensity varying with the passage of time, which is obtained when the mark sets shown in FIG. 7A are illuminated.

FIG. 7A shows the positional relationship between the marks and the beam spot in the case where all marks are situated on the center line of the track, and FIG. 7B shows the reflection light intensity variation in this case. The mark has a diameter of 1 µm, and the marks are arranged with a pitch of 1.5 µm. Since the phase-shift beams have a double-peak light intensity distribution, as stated above, a beam spot S illuminating the optical disc has two adjacent circular spots S1 and S2. The diameter of each of circular spots S1 and S2 is 1.4 µm. The beam spot S moves in the direction of the arrow in FIG. 7A over the track with the passage of time. In this case, the reflection light intensity takes a maximum value when the center of the beam spot S is situated at the center of the mark 26, and takes a minimum value when the center of the spot S is situated just between the marks 26. In the figure, the beam spot situated in a position where the reflection light intensity is maximum is indicated by solid lines, and the spot in a position where the reflection light intensity is minimum is indicated by broken lines. The arithmetic operation of the divider 38 is performed when the circular spots S1 and S2 illuminate different marks 26, that is, when the reflection light intensity is minimum.

The timing at which the arithmetic operation is carried out is determined in the following manner. In FIG. 1, light emitted from the beam splitter 30 enters the light detector 42. The light detector 42 outputs a signal proportional to the light amount, and the signal is input to the differentiating circuit 44. The differentiating circuit 44 differentiates the signal from the light detector 42, and the differentiated output is supplied to the zero-cross detecting circuit 46. The zero-cross detecting circuit 46 detects a zero-cross of the signal output from the differentiating circuit 44, and outputs a pulse signal when the intensity of light received by the light detector 42 takes a minimum value. The pulse signal from the zero-cross detecting circuit 46 is input to the divider 38, and the divider 38 carries out an arithmetic operation by using the pulse signal as a sync signal. As a result, when the reflection light intensity takes a minimum value, that is, when the circular spots S1 and S2 illuminate the two adjacent marks, the position of the peak of the reflection light distribution (i.e. coherence pattern) is detected and the information recorded in the form of "pit distance" is reproduced.

Where the line connecting the centers of the two marks of the mark set is set to cross the center line of the track at a given angle (excluding the right angle), that is, the line is inclined to the center line of the track, information reproduction is performed by all the same process as in the case where the line connecting the centers of the two marks of the mark set is substantially perpendicular to the center line of the track. When the marks of the mark set are arranged with an inclination, the width of the mark sets in a direction perpendicular to the direction of the track is narrower than in the case where the marks are arranged perpendicular to the track. With the narrower width of the mark sets, the mark sets having the same information or a regular mark distance can be formed, with still higher recording density.

The present invention not limited to the above embodiment, and various modifications can be made. Some examples of modifications and changes of the above embodiment, which are covered by the patent claims, will now be described.

Figure 7C:
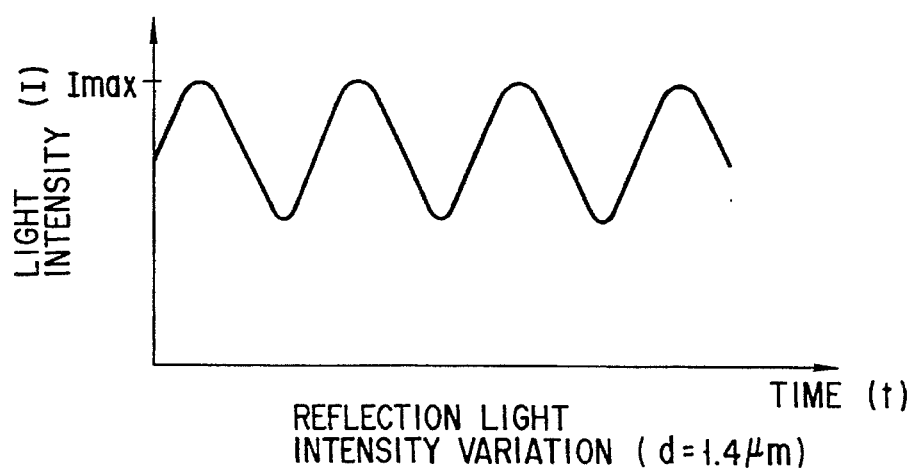
FIG. 7C is a graph showing a reflection light intensity varying with the passage of time, which is obtained when marks arranged with a pitch different from that of the marks shown in FIG. 7A are illuminated.
Figure 8:
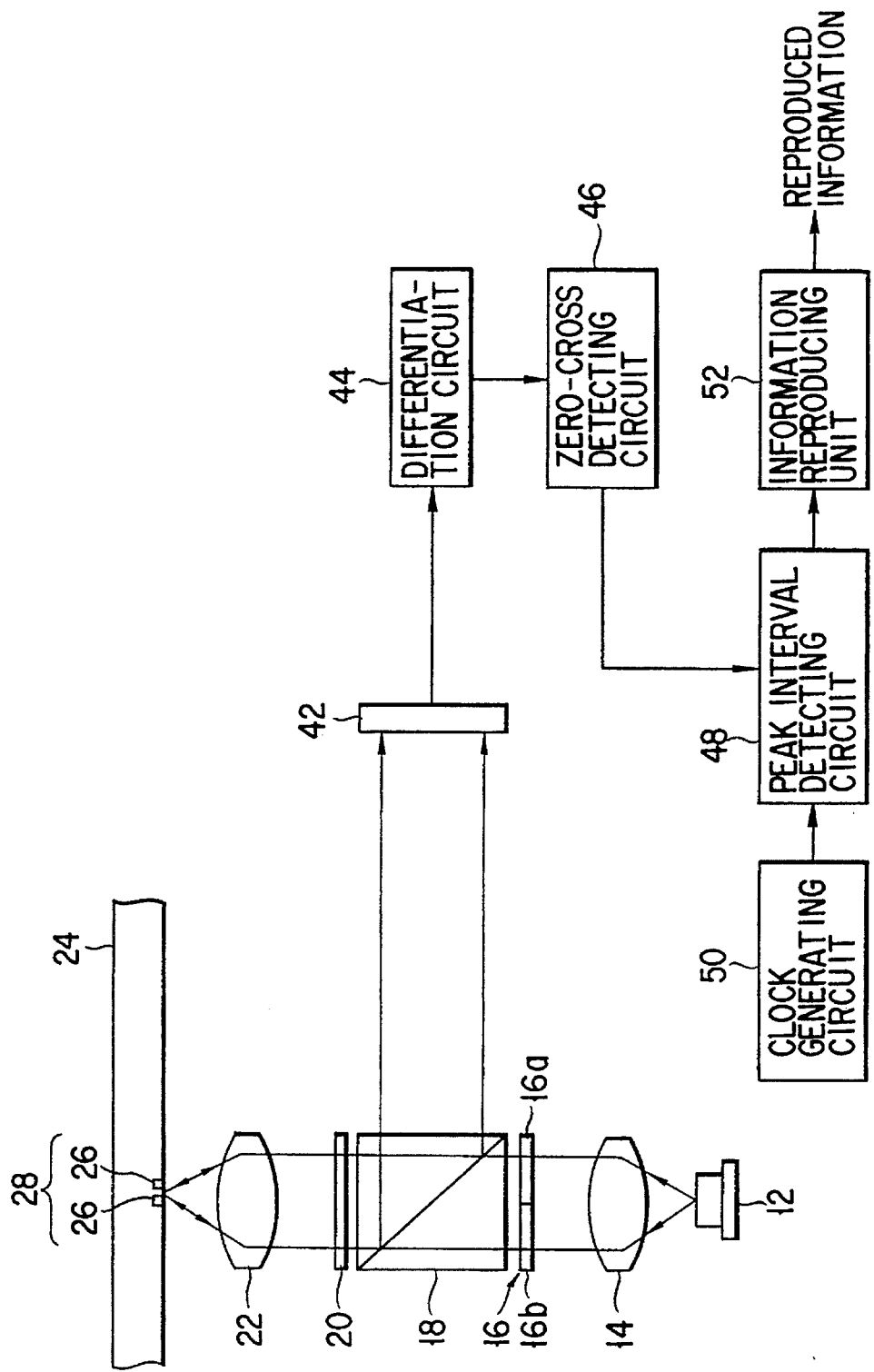
FIG. 8 shows another structure for reproducing information from the mark sets including the marks arranged along the track.

In the above embodiment, information is reproduced on the basis of the distance between peaks in an intensity distribution obtained by illuminating the mark sets. In the case of an optical disc on which all marks are provided along the track, it is possible to reproduce information on the basis of the variation of the intensity of reflection light from the optical disc with the passage of time. The principle for this will now be described. FIG. 7C is a graph showing the reflection light intensity with the passage of time, in the case where the marks provided with a pitch of 1.4 µm are illuminated by phase-shifted light beam. Comparing FIGS. 7B and 7C, it is understood that the intensity variation obtained by illuminating the marks of 1.4 µm pitch differs from the intensity variation obtained by illuminating the marks of 1.5µ pitch with respect to the pitch at which peaks appear. On the other hand, comparing FIGS. 7A and 7B, it is understood that the reflection light intensity takes a maximum value when the center of the beam spot S is located at the center of the mark 26. Accordingly, by finding a time interval between maximum points of the reflection light intensity, information recorded in the form of "mark distance" can be reproduced. FIG. 8 shows a structure for performing such information reproduction. The light detector 42 delivers an output signal to the differentiating circuit 44, which is proportional to the quantity of light received by the light detector 42. The differentiating circuit 44 differentiates the input signal and delivers the differentiated signal to the zero-cross detecting circuit 46. The zero-cross detecting circuit 46 detects a zero-cross of the input signal, and generates a pulse at a timing at which the light intensity takes a maximum value. The pulse, along with a clock signal generated from a clock generating circuit 50, is input to a peak interval detecting circuit 48. The peak interval detecting circuit 48 outputs a signal corresponding to the time interval of the pulses output from the zero-cross detecting circuit 46, that is, the time interval of maximum values of light intensity. The signal corresponds to a mark distance and is converted to reproduced information by an information reproducing unit 52. The reproduced information is output.

Instead of providing the phase plate for producing phase-shifted beam, a light source emitting only a $TEM_{01}$ mode beam may be employed to attain the same advantage. The $TEM_{01}$ mode beam is a phase-shifted beam, as seen in FIG. 9 which shows the amplitude distribution and mode pattern. The process of obtaining only the $TEM_{01}$ mode beam will now be described. In general, in a gas laser, a lateral mode beam is oscillated simultaneously in multi-modes. A stop is provided in a resonator of such a gas laser. By decreasing an effective area of a mirror, only a basic mode beam or $TEM_{01}$ mode beam is obtained. By gradually increasing the diameter of the stop, various mode beams can be oscillated successively from a low-order mode beam. The details of this technique is described in W. W. Rigrod, "ISOLATION OF AXI-SYMMETRICAL OPTICAL-RESONATOR MODES," APPLIED PHYSICS LETTERS, Volume 2, Number 3, 1 Feb. 1963, pp. 51–53. Accordingly, by adjusting the diameter of the stop in the resonator suitably, only the $TEM_{01}$ mode beam can be obtained. In addition, in a semiconductor laser, only the $TEM_{01}$ mode beam can be obtained by controlling the wave guide mode.

On the other hand, instead of providing the phase plate for producing the phase-shifted beam, the optical disc may be provided with means for providing a half-wavelength difference between the optical length, over which part of reproduced light travels, and the optical length, over which the remaining light travels, thereby to attain the same advantage. An example of such means is shown in FIG. 10. FIG. 10 shows a reflection type optical disc having a mark set 28 consisting of two pits 26 whose depths differ by $\lambda/4$. A light length difference of $\lambda/2$ (i.e. phase difference of $\pi$) occurs between the light reflected by one of the pits and the light reflected by the other while the light travels forward and returns backward. Thus, the light from the mark set is identical to that of the above embodiment, and the same function is carried out. On the other hand, in a transmission type optical disc, as shown in FIG. 11, the thicknesses of marks 26 of mark set 28 are different from each other. The disc 24 has an optically transparent substrate 24a and an opaque film 24b provided on the surface of the substrate 24a. Marks 26 are formed as openings in the opaque film 24b. The transparent substrate 24a is provided with a stepped portion with a height L between two marks (openings) 26 constituting the mark set 28. The height L of the stepped portion is determined to meet the condition of $(n-1)L=\lambda/2$ (n=the refractive index of transparent substrate 24a). Thereby, a phase difference of $\lambda/2$ or $\pi$ occurs between the light passing through one of the openings and that passing through the other, and the same function as in the above embodiment is carried out.

In the above description of the embodiment, the phase shift angle of the phase shift beam was $\pi$; however, it is not limited to $\pi$, and the same advantage was obtained in the range of $3\pi/4$ to $5\pi/4$.

What is claimed is:

1. An optical information reproducing apparatus for optically reproducing information recorded as a distance between two optically detectable marks constituting each of a number of mark sets provided along a track of a recording medium, said optical apparatus comprising:

a light source for emitting a reproducing light beam;

radiating means for simultaneously radiating the reproducing light beam onto the two marks constituting each mark set;

phase difference providing means for providing a predetermined phase difference between light beams which, based on said reproducing light beam, are reflected from or pass through the two marks constituting each mark set; and information reproducing means for receiving from the mark set the reproducing beam that includes diffraction pattern generated by the two marks due to the predetermined phase difference caused by said phase difference providing means, and for reproducing information from the reproducing beam.

2. The optical information reproducing apparatus according to claim 1, wherein said phase difference providing means is provided on an optical path between said light source and said mark set constituted by said two marks.

3. The optical information reproducing apparatus according to claim 2, wherein said phase difference providing means comprises a phase plate for making the phase of a part of the reproducing light beam from that of another part of the reproducing light beam, such that reproducing light beams with different phases irradiate the two marks of each set.

4. The optical information reproducing apparatus according to claim 3, wherein said two marks are situated on both sides of a center line of the track, a line connecting the centers of said two marks being substantially perpendicular to the center line of the track, and the phase plate is situated such that one side of each mark set in respect of the center line of the track is illuminated by the beam having a phase different from the phase of the beam for illuminating the other side of the mark set.

5. The optical information reproducing apparatus according to claim 3, wherein said marks of each mark set are arranged along the track and said two marks are adjacent to each other, and the phase plate is situated such that the beams having passed through the phase plate have different phases to illuminate the track while being juxtaposed along the track.

6. The optical information reproducing apparatus according to claim 1, wherein said two marks that constitute each mark set are pits formed on a recording medium, and said phase difference providing means is a recording medium having mark sets each comprising two pits with different depths.

7. The optical information reproducing apparatus according to claim 1, wherein said phase difference providing means is a recording medium having portions with different thicknesses at which said two marks are formed and through which the reproducing light beam passes.

8. The optical information reproducing apparatus according to claim 1, wherein said light source is a laser oscillating in multi-modes, and said phase difference providing means has means for selectively obtaining only a light beam of one of the multi-modes, in which an amplitude distribution is inverted.

9. The optical information reproducing apparatus according to claim 1, wherein said information reproducing means includes arithmetic operation means for detecting the distance between the marks on the basis of a light intensity distribution of the light beam from the mark set, and reproducing information on the basis of the detected distance.

10. The optical information reproducing apparatus according to claim 1, wherein said marks of each mark set are arranged along the track and said two marks are adjacent to each other, and said information reproducing means has arithmetic operation means for detecting the distance between the marks on the basis of the variation of the intensity of the light beam from the mark set with the passage of time, and reproducing the optical information on the basis of the detected distance.

11. A recording medium comprising:

mark sets provided along the track, each of which has two optically detectable marks formed so as to have a distance corresponding to information; and means for providing a phase difference between the reproducing light beam from one mark of the mark set and the reproducing light beam from the other mark of the mark set, such that the phase difference provided for the reproducing light beams from one of the mark sets is equal to the phase difference from another one of the mark sets.

12. The recording medium according to claim 11, wherein said optically detectable marks include pits with predetermined depth, and said phase difference providing means comprises two pits with different depths.

13. The recording medium according to claim 12, wherein two pits of said mark set are formed in a direction substantially perpendicular to the track.

14. The recording medium according to claim 12, wherein said pits are formed along the track and said two pits are adjacent to each other.

15. The recording medium according to claim 11, wherein said recording medium comprises an optically transparent member capable of passing the reproducing light beam through, and an optically opaque film formed on the surface of the transparent member, which cannot pass the reproducing light beam through, said optically detectable marks are openings formed in the opaque film, and said phase difference providing means includes a transparent member having a portion, where part of the reproducing light beam passes through the opening constituting one mark of the mark set, and a portion, where the remaining part of the reproducing light beam passes through the opening constituting the other mark of the mark set, both portions of the transparent member having thicknesses different from each other.

16. The recording medium according to claim 15, wherein two openings of said mark set are formed in a direction substantially perpendicular to the track.

17. The recording medium according to claim 15, wherein said openings of each mark set are formed along the track and said two openings are adjacent to each other.

18. The optical information reproducing apparatus according to claim 1, wherein the phase difference provided by said phase difference providing means is between $3/4\,\pi$ and $5/4\,\pi$, and preferably $\pi$.

* * * * *